Patented Dec. 29, 1953

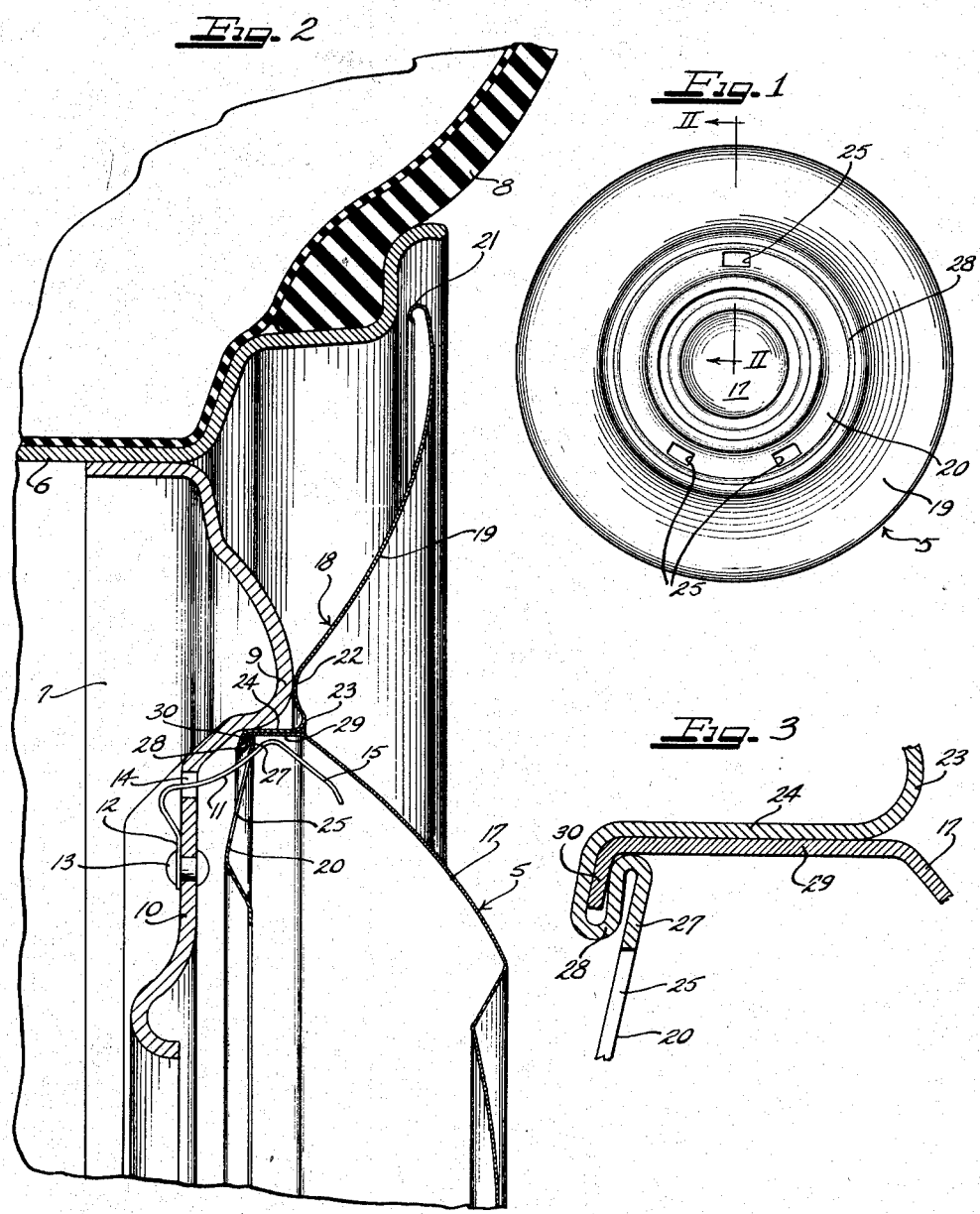

2,664,318

UNITED STATES PATENT OFFICE 2,664,318

WHEEL COVER

George Albert Lyon, Detroit, Mich.

Application August 13, 1949, Serial No. 110,101

9 Claims. (Cl. 301—37)

The present invention relates to improvements in wheel structures and more particularly concerns an improved wheel structure in which novel protective and ornamental wheel cover means are utilized.

An important object of the present invention is to provide an improved wheel structure in which a novel wheel cover is applied to the outer side of the wheel in protective, ornamental relation.

Another object of the invention is to provide a novel wheel cover for disposition at the outer side of a vehicle wheel in snap-on, pry-off relation.

A further object of the invention is to provide an improved vehicle wheel cover including a composite construction involving a central crown portion and a trim ring portion.

Still another object of the invention is to provide an improved structure for uniting the components of a composite vehicle wheel cover.

According to the general features of the invention there is provided in a wheel structure including a multi-flange tire rim and a load-sustaining body portion having generally centrally disposed cover retaining means, a wheel cover for the outer side of the wheel including a central crown portion and a trim ring portion, the central crown portion being dimensioned to substantially cover the central portion of the wheel body and the trim ring portion being dimensioned to substantially cover the tire rim and the portion of the wheel body intervening between the tire rim and the central crown portion, the trim ring portion also having a central flange underlying the crown portion and formed with means cooperating with the retaining means on the wheel body to retain the cover on the wheel, the central crown portion having a generally axially extending marginal flange permanently interconnected with the trim ring portion intermediate the radially outer section of the trim ring portion and said central retaining flange of the trim ring portion.

According to other general features of the invention there is provided in a wheel cover for disposition at the outer side of the vehicle wheel, a central crown portion and a trim ring portion formed separately, said trim ring portion having an outer wheel covering section and an inner section including means for engagement with structure on the wheel for attachment of the cover to the wheel, said crown portion having a marginal formation permanently interengaged with the trim ring portion intermediate said outer and inner sections of the trim ring portion.

According to further features of the invention the trim ring portion has an annular fold intervening between the sections thereof and the margin of the crown portion has a terminal flange interengaged with said fold.

Other objects, features and advantages of the present invention will be readily apparent from the following detailed description of a preferred embodiment taken in conjunction with the accompanying drawings in which:

Figure 1 is a rear elevational view of a wheel cover embodying the features of the present invention;

Figure 2 is an enlarged radial sectional view through the wheel cover of Figure 1 showing the same as applied to a vehicle wheel; and Figure 3 is a substantially enlarged fragmentary sectional detail view taken in the same plane as in Figure 2, and showing details of the interconnection between the separately formed crown and trim ring portions of the cover.

As shown on the drawings:

A wheel cover 5 according to the present invention is adapted to be applied to the outer side of a vehicle wheel including a tire rim 6 and a wheel body 7. The tire rim is of the multi-flange drop center type in common use and is adapted to support a pneumatic tire and tube assembly 8.

The wheel body is attached in suitable manner as by spot welding or riveting to the base flange of the tire rim and has an annular intermediate generally axially outwardly extending reinforcing nose bulge or rib 9 defining an inset central bolt-on flange 10 by which the wheel is adapted to be attached to the axle structure of a vehicle (not shown).

The bolt-on flange 10 is equipped with means for retaining the wheel cover 5 on the wheel, such means comprising retaining spring clips 11 which are by preference secured through the medium of respective base flanges 12 as by means of rivets 13 to the inner face of the base flange 10 and have the neck portions thereof extending through respective apertures 14 in the base flange adjacent to the radially inner side of the nose bulge 9. At their outer ends the retaining clips 11 have cam flanges 15, the clips being biased toward the nose bulge 9, but having the cover retaining heads thereof slightly spaced therefrom to accommodate portions of the wheel cover in retaining relation.

The wheel cover 5 is of the type which substantially fully covers the outer side of the wheel and for this purpose includes a central crown portion 17 and a radially outwardly extending trim ring portion 18, both portions of the cover being permanently united to provide a composite unitary structure.

According to the present invention, the trim ring portion 18 is constructed to support and retain in assembly therewith the central crown portion 17. To this end, the trim ring portion 18 is formed with a radially outer section 19 and a radially inner section 20. The radially outer section 19 is of a magnitude and extent to substantially cover the tire rim 6 and a substantial portion of the wheel body 7 from the tire rim to the central portion of the wheel body and more particularly the nose bulge 9. As shown, the outer section 19 may be of convex cross-section with the radially outer extremity turned under as at 21 to provide a reinforcing and finishing bead which in assembly is preferably somewhat spaced from the adjacent portion of the tire rim so as to afford a ventilation gap between the outer edge of the cover and the tire rim. At its inner margin, the outer section 19 is preferably formed with a generally axially inwardly bulging annular rib 22 which in assembly with the wheel is adapted to seat upon the nose bulge 9. Radially inwardly of the seating rib 22 the inner margin of the trim section 19 is formed with a generally axially outwardly projecting reverse reinforcing rib 23 from which a generally axially inwardly extending annular flange 24 extends and which is of a diameter to fit within the depression at the radially inner side of the nose bulge 9.

The radially inner section of the trim ring portion of the cover is axially inwardly inset from the radially outer section 19 to the extent of the flange 24 and extends radially inwardly beyond the cover retaining clips 11. By predetermining the length of the connecting flange 24, the disposition of the inner trim ring section 20 and the assembled relation with the cover is predetermined to have the section 20 lie in spaced relation to the bolt-on flange 10 sufficiently to clear attachment bolts (not shown) by which the wheel is attached to the vehicle axle.

For cover retaining cooperation with the spring clips 11, the inner retaining section 20 of the trim ring is formed with appropriate clip passing or clearance apertures 25. As best seen in Figure 1, there may be three of the apertures 25 appropriately disposed as in a generally triangular relationship. The apertures are properly dimensioned to clear the cam heads 15 of the clips 11 when the cover is applied to or removed from the wheel. To effect cover retaining engagement with curved retaining neck portions of the clips 11, the radially outer sides of the apertures 25 are defined by clip-engageable flange portions 27 extending radially inwardly from the axial connecting flange 24. The retaining flange portions 27 are strongly reinforced and made substantially rigid to resist deflection when forcibly engaged by the clips 11, by means of a return bent fold structure 28 of substantially tight S-shaped cross-section as best seen in Figure 3. This provides a strong reinforcement both radially and axially by reason of the triple layer formation that results from the folding at the juncture between the inner section 20 of the trim ring and the connecting flange 24. Moreover, the radially inwardly extending rounded inner portion of the fold serves as a convenient smooth camming surface against which the cam flange portions 15 of the retaining clip heads are engageable when the cover is pushed axially inwardly into the mounted position. For this purpose the radially outer edges defining the clip openings 25 are approximately in line with the inwardly bulging surface of the fold, or at least not much beyond the true alignment.

According to the present invention, the central crown portion 17 is permanently secured in assembly with the trim ring 18 of the cover by having the marginal extremity of the crown portion interengaged with the trim ring portion adjacent juncture of the outer and inner sections 19 and 20 of the trim ring portion. To this end, the margin of the crown portion is provided with a generally axially inwardly extending flange substantially complementary to the connecting flange 24 of the trim ring portion of the cover and dimensioned to lie snugly against the radially inner side of the flange 24. At its extremity the marginal flange 29 has a radially inwardly extending terminal flange 30 which is interengaged within the axially innermost radially outwardly opening portion of the fold 28, the parts being firmly crimped together into a rigid, permanent assembly. The assembly thus provided affords a very strong joint between the cover portions and instead of only three layers at the fold there are four layers and all provide generally radially extending flanges resisting axial deflection, as well as four bent ribs cooperating with the radial layers in resisting axial deflection. As a result, both portions of the cover can be made from quite thin sheet metal without any danger of distortion and improper retention of the cover by the spring clips 11 because of the action of the spring clips in the application or removal of the cover. It will be understood, of course, that by the obvious limitations of drawing technique it has been necessary to substantially exaggerate the thickness of the metal in the portions of the cover in the drawings.

In applying the cover to the wheel, the cover is generally centered with respect to the wheel with the inner rounded edge of the fold 28 resting against the camming flanges 15 of the retaining clip heads, and the cover is then pushed axially inwardly until the retaining clips snap into retaining engagement with the retaining margins 27 defining the clip apertures in the inner section 20 of the trim ring portion of the cover. This draws the cover axially inwardly to effect snug seating engagement of the inwardly bulged seating rib 22 of the outer section 19 against the nose bulge 9. For removal of the cover a pry-off tool, such as a screw driver or the like is applied between the reinforced outer extremity flange 21 and the tire rim and pry-off force applied to force the cover axially free from the retaining clips. The multi-curved cross-sectional formation of the outer section 19 of the cover affords adequate rigidity therein to accommodate the pry-off force applied thereto.

The outer side of the cover may, of course, be appropriately finished as desired.

It will be understood that modifications and variations may be effected without departing from the scope of the novel concepts of the present invention.

I claim as my invention:

1. In a wheel structure including a multi-flange tire rim and a load-sustaining body portion having an intermediate annular nose bulge and generally centrally disposed cover retaining clip means, a wheel cover for the outer side of the wheel including a central crown portion and a trim ring portion, the central crown portion being dimensioned to substantially cover the central portion of the wheel body and the trim ring portion being dimensioned to substantially cover the tire rim and the portion of the wheel body intervening between the tire rim and the central crown portion, the trim ring portion having a generally L-shaped annular intermediate flange seating on the nose bulge and also having a central radially inwardly extending flange underlying the crown portion and including apertures having radially outer respective edges cooperating with the retaining clip means on the wheel body to retain the cover on the wheel, the central crown portion having a generally axially extending marginal flange permanently interconnected with the trim ring portion intermediate said L-shaped annular intermediate formation of the trim ring portion and said aperture in the central retaining flange of the trim ring portion.

2. In a wheel cover for disposition at the outer side of a vehicle wheel, a central crown portion and a trim ring portion formed separately, said trim ring portion having an outer wheel covering section and an inner section including means for engagement with structure on the wheel for attachment of the cover to the wheel, said crown portion having a marginal formation permanently interengaged with the trim ring portion intermediate said outer and inner sections of the trim ring portion, the trim ring portion having an annular fold intervening between the sections thereof and the margin of the crown portion having a terminal flange interengaged with said fold.

3. In combination in a composite vehicle wheel cover, a trim ring annulus, and a central crown portion, said trim ring annulus having an intermediate axially extending annular flange portion with an annular fold opening generally radially toward said annular flange portion, said central crown portion having a peripheral axially extending flange telescopically related to said annular flange and including generally radially extending terminal flange portion permanently interengaged in said fold.

4. In a vehicle wheel cover, an annular trim ring portion including a radially outer section and a radially inner section, said inner section having retaining clip apertures, and a reinforcing fold between said sections at the radially outer side of said apertures and including a fold opening generally radially outwardly, and a central crown portion disposed in concealing relation to said radially inner section and having a generally axially extending marginal flange including a generally radially inwardly extending terminal portion interengaged within the radially outwardly opening fold.

5. In combination in a vehicle wheel cover, an annular portion, a circular portion, said annular portion having a plurality of retaining clip apertures, an annular fold defining the retaining clip engageable margins of said apertures, said circular portion having a flange interengaged within said fold, said fold and said flange providing a multi-layer reinforcement for said clip-engageable margins.

6. In combination in a composite vehicle wheel cover of the type adapted to be applied to the outer side of a vehicle wheel including a multi-flange tire rim and a wheel body including an annular reinforcing nose bulge defining a central depressed bolt-on flange, an annular trim portion including a radially outer section for substantially concealing disposition opposite the tire rim and a substantial portion of the wheel body radially outwardly of and including the nose bulge and having a generally axially inwardly extending rib adapted to seat against the nose bulge and a radially inner axially outwardly return bent rib defined at its radially inner side by an axially extending flange to fit within the nose bulge, a generally radially inwardly extending retaining flange section joined to the axially inner extremity of said axial flange by a return bent fold having the layers thereof extending generally radially, said inner section having retaining clip openings therein with the radially outer edges of the clip openings adjacent to said fold and reinforced thereby, and a central crown portion concealing said inner section and having a generally axially extending marginal flange abutting and disposed within said axial flange of the annular cover portion, the axially inner extremity of the crown marginal flange having generally radially inwardly extending extremity means interengaged in permanent assembly within said fold.

7. In combination in a composite cover assembly, an annular radially outer portion, a circular inner portion, both of said portions having generally axially extending annular flanges in telescoped relation, the axially inner portion of the flange of the annular cover portion being directed radially inwardly and turned upon itself and then reversely bent inwardly in substantially S-shape, and the telescoped flange of the inner cover portion having a radially inwardly turned inner extremity engaged within said S-shaped flange portion.

8. In a wheel structure including a multi-flange tire rim and a load-sustaining body portion having an annular axially outwardly reinforcing nose portion and an inset bolt-on flange, said bolt-on flange having axially outwardly extending retaining clips acting resiliently toward said nose bulge, a cover disposed in concealing relation at the outer side of the wheel and having a trim ring member in substantially concealing relation with the tire rim and having the radially outer margin reinforced and in spaced relation to the tire rim and an inner portion engaging against said nose bulge, the radially inner extremity section of the annular cover member including a generally axially extending flange portion fitting inside the nose bulge and a generally radially extending retaining flange portion engageable in snap-on, pry-off relation with the retaining clips, said retaining flange portion having a generally S-shaped fold providing a radially outwardly opening annular socket, and a central crown cover portion concealing the bolt-on flange and said retaining flange section and having a marginal formation permanently secured in assembly within said socket.

9. In combination in a cover assembly of the character described, a circular cover member having an intermediate generally S-shaped annular fold and a radially inner flange extending generally radially inwardly from said fold, said flange having a plurality of clip-receiving apertures therein with the radially outer edges of the apertures generally coincident with the adjacent fold shoulder, and a second circular cover member having a flange engaged within said fold and thereby interlocked in assembly with the first mentioned cover member, said first and second cover members having interengaging shoulders at said fold, said fold and second cover member flange engaged therein providing four layers of material at the juncture of the cover members and four bent rib shoulders affording strong reinforcement at the juncture for engagement by retaining spring clips on a wheel.

GEORGE ALBERT LYON.

References Cited in the file of this patent

UNITED STATES PATENTS

| Number | Name | Date |
| --- | --- | --- |
| 2,190,669 | Lyon | Feb. 20, 1940 |
| 2,401,492 | Lyon | June 4, 1946 |

FOREIGN PATENTS

| Number | Country | Date |
| --- | --- | --- |
| 264,397 | Italy | Apr. 26, 1929 |